Patented June 14, 1938

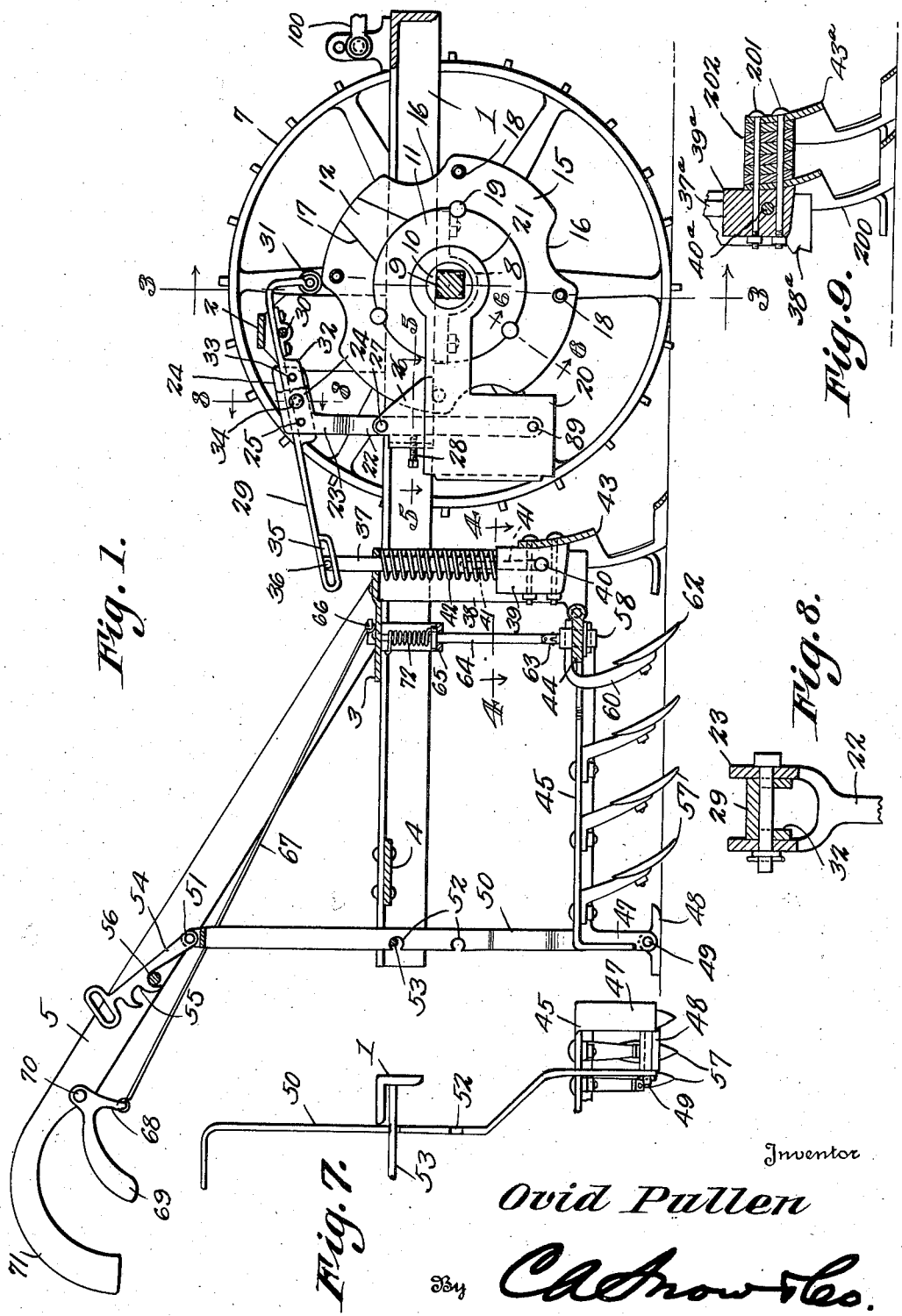

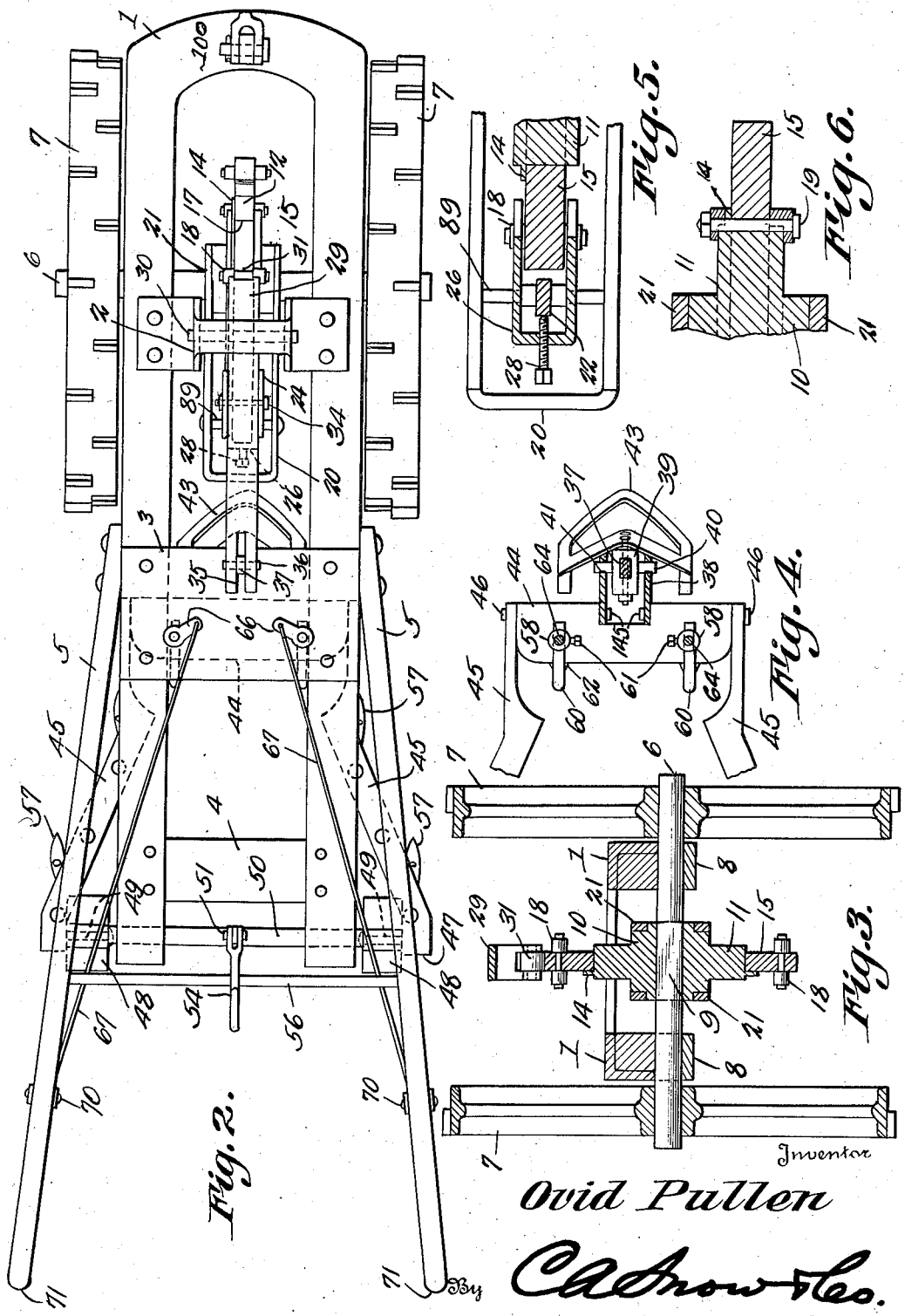

2,120,867

UNITED STATES PATENT OFFICE 2,120,867

COTTON CHOPPER

Ovid Pullen, Harmony, N. C.

Application June 18, 1937, Serial No. 148,995

4 Claims. (Cl. 97—18)

The device forming the subject matter is a cotton chopper, and one object of the invention is to improve the means whereby the chopping instrumentalities are raised and lowered. Another object of the invention is to improve the soil-engaging elements, considered relatively to other parts of the machine. A further object of the invention is to make the device readily adaptable to different chopping distances considered horizontally. Another object of the invention is to construct the device in such a way that the fertilizer will not be dug out of the row.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in longitudinal section, a device constructed in accordance with the invention, most parts being in elevation;

Fig. 2 is a top plan;

Fig. 3 is a transverse section on the line 3—3 of Fig. 1;

Fig. 4 is a section on the line 4—4 of Fig. 1;

Fig. 5 is a section on the line 5—5 of Fig. 1;

Fig. 6 is a section on the line 6—6 of Fig. 1;

Fig. 7 is a rear elevation showing certain of the soil-engaging elements and the means whereby they are adjusted and controlled;

Fig. 8 is a section on the line 8—8 of Fig. 1;

Fig. 9 is a fragmental vertical section showing a slight modification.

In carrying out the invention, there is provided a frame 1, which is U-shaped in top plan, as Fig. 2 will show. At its forward end, the frame 1 is supplied with draft means 100. The side arms of the frame 1 are joined by a forward arch 2, an intermediate brace 3, and a rear brace 4. Upwardly inclined and rearwardly extended handles 5 are secured to the side arms of the frame 1.

An axle 6 (Fig. 3) is journaled in bearings 8 carried by the side arms of the frame 1. Ground wheels 7 are secured to the ends of the axle 6, outwardly of the side arms of the frame 1. The axle 6 has a squared intermediate portion 9, upon which is held against relative rotation, the hub 10 of a disk 11 provided on its periphery with an outwardly extended arm 12 shown in Fig. 1. As seen in Fig. 3, the disk 11 is provided on its periphery with an annular outstanding flange 14. A ring 15 surrounds the disk 11 and abuts laterally against the flange 14. The ring 15 has cam notches 16 in its edge (Fig. 1). There may be more or less of these cam notches, and a ring 15 having a given number of notches may be replaced by another ring having more or less notches. The ring 15 has a slot 17 that receives the arm 12 on the disk 11. Lateral projections or rollers 18 are journaled on the ring 15 and are disposed adjacent to the cam notches 16. Securing elements 19, seated partly in the periphery of the disk 11 and partly in the ring 15 (Fig. 1) hold the ring 15 in abutment with the flange 14, against lateral displacement.

Should it be desired to replace one ring 15 by another ring having more or less of the cam notches 16, the securing elements 19 may be removed, the ring 15 being slid sidewise off the disk 11. When this is done, the slot 17 in the ring 15 no longer is occupied by the arm 12 on the disk 11 and the ring simply may be dropped down and removed, the unoccupied slot 17 in the ring 15 affording a space through which the axle 6 can pass.

The numeral 20 marks a yoke which, as shown in Fig. 5, is U-shaped in top plan. The side arms of the yoke 20 have eyes or bearings 21 which can turn on the hub 10 of the disk 11. The yoke 20, therefore, can have an up and down swinging movement. A connection 22, in the form of a rod, extends downwardly within the yoke 20. The lower end of the connection 22 is pivotally connected at 89 with the side plates of the yoke 20. At its upper end, the connection 22 has a fork 23. The fork 23 has forwardly extended depending side flanges 24. There are longitudinally spaced openings 25 in the side flanges 24.

The numeral 26 designates a shoulder member which is approximately triangular in side elevation (Fig. 1) and U-shaped as to plan (Fig. 5). The shoulder member 26 receives the connection 22 and is pivoted at its upper end to the connection, as shown at 27. A set screw or adjustable stop 28 is threaded into the rear portion of the shoulder member 26 and bears against the rear edge of the connection 22, as shown in Fig. 5. The lower edge of the shoulder member 26 lies in the path of the roller projections 18 on the ring 15 which is attached to the axle 6 by the disk 11 and the squared portion 9 of the axle.

The numeral 29 marks a resilient lever. The lever is fulcrumed intermediate its ends, and near to its front end, as shown at 30, upon the forward arch 2. The lever 29 has a depending forward end on which is journaled a roller 31 adapted to traverse the periphery of the ring 15 and enter the cam notches 16. Since the roller projections 18 on the ring 15 are adapted to cooperate with the lower edge of the shoulder member 26 on the connection 23, and since the roller 31 on the forward end of the lever 29 is adapted to enter the notches 16 of the ring, the lever 29 is made vertically resilient, in order to avoid the fine machine work necessary for a proper timing. Intermediate its ends, the lever 29 is provided with a depending portion 32, received between the side flanges 24 of the fork 23 on the upper end of the connection 22 and provided with a plurality of openings 33. In any selected ones of the openings 25 of the connection 23, a pivot element 34 is mounted. The connection 23, therefore, is pivotally connected with the lever 29 intermediate its ends, and behind the fulcrum 30 of the lever.

In its rear end, the lever 29 has an elongated slot 35, receiving a cross pin 36 in a vertically movable standard 37, mounted to slide in the crown of an arch 38 formed integrally with the intermediate brace 3. A foot 39 is secured to the lower end of the standard 37. The foot 39 carries a cross pin 40, mounted to move in vertical slots 41 formed in the side portions of the arch 38. A compression spring 42 surrounds a portion of the standard 37. The upper end of the compression spring 42 abuts against the crown of the arch 38, as shown in Fig. 1, the lower end of the spring abutting against the foot 39 on the standard 37. A share 43 is secured to the foot 39 of the standard 37.

A cross head 44 is secured at 145 (Fig. 4) to the lower end of the arch 38. Rearwardly extended and outwardly diverging beams 45 are pivoted at 46 to the ends of the cross head 44 for vertical swinging movement. The beams 45 have depending ends 47 connected by pivot elements 49 to soil-engaging shoes 48. The beams 45 are connected by the pivot elements 49 to the lower ends of an inverted U-shaped retaining bar or yoke 50. The retaining bar 50 has seats 52 in its rear edge, the uppermost of which is adapted to engage a cross rod 53 connecting the side portions of the frame 1, the construction being such that the beams 45 are held down in the horizontal position of Fig. 1. A handled latch 54 is pivoted at 51, to the intermediate portion of the upper end of the retaining bar 50 and has a rack 55 which engages a rod 56 extended between the handles 5, the latch aiding in holding down the retaining bar 50 and the beams 45.

Soil-engaging elements 57, such as bullpoints are secured to the beams 45. Short shafts 58 are journaled in the cross head 44 and in the shafts 58, goose necks 60 are secured by set screws 61. Forward soil-engaging elements 62 are secured to the lower ends of the goose necks 60. The short shafts 58 are connected by universal joints 63 to vertical shafts 64 journaled in the intermediate brace 3 and in brackets 65 that extend downwardly, as shown in Fig. 1, from the brace 3. On their upper ends, the shafts 64 are supplied with crank arms 66. To the crank arms 66 are pivoted connections 67, pivotally connected at their rear ends to depending fingers 68 on grips 69, the grips being pivoted at 70 to the plow handles 5 and being located below the fixed grips 71 of the plow handles 5.

In practical operation, the wheels 7 are rotated by contact with the ground and rotation is imparted to the axle 6, to the disk 11 and to the ring 15 which is secured to the disk. The roller 31 on the lever 29 rides on the periphery of the ring 15 and holds down the standard 37, so that the share 43 may cooperate with the soil. When the ring 15 is rotated, along with the disk 11, the roller projections 18 on the ring 15 engage the under edges of the shoulder member 26 and carry the shoulder member 26 upwardly, along with the connection 22 and the yoke 20, the roller 31 on the lever 29 entering the corresponding notch 16 in the ring 15, the lever 29 being tilted upwardly at its rear end, and the standard 37 and the share 43 being raised, the share, in this way, being caused to clear the soil at intervals, so as to skip portions of the standing plants. When the roller projections 18 on the ring 15 clear the shoulder member 26 on the connection 22, the parts are restored to the position of Fig. 1, under the action of the spring 42.

The operator, holding the grips 71 of the plow handles 5, may lay hold the grips 69 and tilt them on their fulcra 70, the connections 67 cooperating with the arms 66 on the upper ends of the shafts 64 to rotate those shafts and the short shafts 58, the forward soil-engaging elements 62 thereby being shifted in and out with respect to the plants, so as to cast the soil properly toward the plants. Coiled springs 72, engaged with the brackets 65 and with the shafts 64 tend to return the shafts 64 and the forward soil-engaging elements 62 to normal position when the auxiliary grips 69 are released.

In Fig. 9, parts hereinbefore described have been designated by numerals previously used, with the suffix "a". A soil-engaging element 200, constructed like the soil-engaging element 43a, may be placed behind the soil-engaging element 43a in abutment with the foot 39a, securing elements 201 being extended through the foot 48, through the soil-engaging elements 200 and 43a, and through spacers 202, mounted on the securing elements 201 and located between the soil-engaging elements 200 and 43a. The soil-engaging element 200 is useful when it is desired to chop back a little further than can be done by the use of the soil-engaging element 43a alone. The back spacing mechanism shown at Fig. 9 is a useful but not absolutely necessary adjunct to the machine.

Having thus described the invention, what is claimed is:

1. A cotton chopper comprising a frame, an axle journaled on the frame, a ground wheel secured to the axle, a rotatable member secured to the axle and having cam notches in its periphery, the rotatable member being supplied with projections, a yoke mounted to swing vertically with respect to the axle, a lever, a fulcrum carrying the lever intermediate its ends on the frame for vertical swinging movement, the lever being provided at its forward end with a part which rides on the periphery of the rotatable member and enters the cam notches, a connection having its upper end pivoted to the lever to the rear of the fulcrum and having its lower end pivoted to the yoke, a shoulder piece pivoted to the connection and so located as to be engaged by the projections, means carried by the yoke and engaging the shoulder piece to adjust the position of the shoulder piece, a soil-engaging means, and mechanism for connecting the soil-engaging means with the rear end of the lever.

2. A cotton chopper comprising a frame, an axle journaled on the frame, a ground wheel secured to the axle, a rotatable member secured to the axle and having cam notches in its periphery, the rotatable member being supplied with projections, a lever, a fulcrum carrying the lever intermediate its ends on the frame for vertical swinging movement, the lever being provided at its forward end with a part which rides on the periphery of the rotatable member and enters the cam notches, a connection having its upper end pivoted to the lever to the rear of the fulcrum, a shoulder piece carried by the connection and so located as to be engaged by the projections, a soil-engaging means, and mechanism for connecting the soil-engaging means with the rear end of the lever, the lever being resilient to secure a proper timing in the operation of the lever, without an accurate location of the projections with respect to the cam notches.

3. A cotton chopper comprising a frame, an axle journaled on the frame, a ground wheel secured to the axle, a disk secured to the axle, a ring having projections, means for securing the ring to the disk detachably, the disk having an opening through which the axle may pass when the ring is detached from the disk, thereby permitting one ring to be substituted for another, the disk having a part which fills the opening at the periphery of the ring, thereby making the periphery of the ring continuous, the ring having cam notches in its periphery and being provided with projections, a lever, a fulcrum carrying the lever intermediate its ends on the frame, the lever being provided at its forward end with a part which rides on the periphery of the ring and enters the cam notches, means carried by the lever and engageable by the projections to impart vertical swinging movement to the lever, and soil-engaging means connected to the rear end of the lever.

4. A cotton chopper comprising a frame, an axle journaled on the frame, a ground wheel connected to the axle, a standard mounted for vertical movement on the frame, means driven by the axle for imparting vertical reciprocation to the standard, a first soil-engaging element connected to the standard, a depending bracket forming part of the frame, a cross head pivoted to the bracket for up and down swinging movement, rearwardly diverging beams pivoted to the cross head for up and down swinging movement, means under the control of an operator for swinging the beams upwardly and downwardly for adjustment, second soil-engaging elements carried by the beams and located to the rear of the first soil-engaging element, third soil-engaging elements located between the second soil-engaging elements and the first soil-engaging element, means for mounting the third soil-engaging elements on the cross head for lateral swinging movement, and means under the control of an operator for imparting lateral swinging movement to the third soil-engaging elements.

OVID PULLEN.